(12) United States Patent
Stephens

(10) Patent No.: US 6,583,308 B2
(45) Date of Patent: Jun. 24, 2003

(54) SHORT-CHAIN POLYMERIC YELLOW CYANOESTER-DERIVATIVE COLORANTS AND ARTICLES COMPRISING SUCH COLORANTS

(75) Inventor: Eric B. Stephens, Roebuck, SC (US)

(73) Assignee: Milliken & Company, Spartanburg, SC (US)

( * ) Notice: Subject to any disclaimer, the term of this patent is extended or adjusted under 35 U.S.C. 154(b) by 27 days.

(21) Appl. No.: 10/008,207

(22) Filed: Nov. 3, 2001

(65) Prior Publication Data

US 2003/0100640 A1 May 29, 2003

(51) Int. Cl.$^7$ .............................................. C07C 255/06
(52) U.S. Cl. ...................................... 558/426; 568/607
(58) Field of Search ........................... 558/426; 568/607

(56) References Cited

U.S. PATENT DOCUMENTS

| | | | |
|---|---|---|---|
| 4,758,243 A | * | 7/1988 | Rekers et al. .................. 8/627 |
| 4,981,516 A | | 1/1991 | Kluger et al. ................. 106/22 |
| 5,591,833 A | * | 1/1997 | Hines et al. ................. 534/607 |

* cited by examiner

*Primary Examiner*—Joseph K. McKane
*Assistant Examiner*—Kamal Saeed
(74) *Attorney, Agent, or Firm*—Terry T. Moyer; William S. Parks

(57) ABSTRACT

A yellow colorant comprising a chromophore having at least one poly(oxy-$C_2$–$C_4$-alkylene) chain attached to an aromatic methine backbone having at least one cyanoester moiety attached thereto is provided. The ester portion must include a $C_1$–$C_8$ (such as ethyl, butyl, hexyl, or ethyl-hexyl) pendant group and the poly(oxyalkylene) chain must be at most 10 monomers and at least 3 monomers, with ethylene oxide as the capping group. Such a specific group of coloring agents provides the best overall yellow colorations or effects (either alone or in blends with other coloring agents, particularly at low color loadings) as well as the best overall low extraction levels when present within clear polyester (such as polyethylene terephthalate, for example), when compared to all other known polymeric yellow colorants for the same end-use. Compositions and articles comprising such colorants are provided as well as methods for producing such inventive colorants.

1 Claim, No Drawings

US 6,583,308 B2

SHORT-CHAIN POLYMERIC YELLOW CYANOESTER-DERIVATIVE COLORANTS AND ARTICLES COMPRISING SUCH COLORANTS

FIELD OF THE INVENTION

This invention relates to yellow colorants comprising a chromophore having at least one poly(oxy-$C_2$–$C_4$-alkylene) chain attached to an aromatic methine backbone having at least one cyanoester moiety attached thereto. The ester portion must include a $C_1$–$C_8$ (such as ethyl, butyl, hexyl, or ethyl-hexyl) pendant group and the poly(oxyalkylene) chain must average at most 6 monomers and at least 3 monomers, with ethylene oxide as the capping group. Such a specific group of coloring agents provides the best overall yellow colorations or effects (either alone or in blends with other coloring agents, particularly at low color loadings) as well as the best overall low extraction levels when present within clear polyester (such as polyethylene terephthalate, for example), when compared to all other known polymeric yellow colorants for the same end-use. Compositions and articles comprising such colorants are provided as well as methods for producing such inventive colorants.

DISCUSSION OF THE PRIOR ART

All U.S. patents cited within this specification are hereby incorporated by reference. There continues to be a need to provide versatile colorants within various applications such that the coloring agent itself exhibits excellent colorations (particularly at low color loadings and due to high color values due to low degrees of pendant group additions thereto and thus greater amounts of chromophore constituents within the colorant compound itself), high thermal stability, effective lightfastness (or drastic reduction in possibility of removal therefrom via extraction by solvents or like sources), ease in handling, ability to mix thoroughly with other coloring agents and thus to provide effective different hues and tints within or on target substrates, and acceptable toxicity levels. There has been a need to provide improved colorants meeting this criteria for certain thermoplastic media, such as polyesters, such that the colorants themselves exhibit excellent compatibility therein (for instance in terms of intrinsic viscosity loss and the other characteristics desired for such plastics as noted above). In particular, such characteristics for polyesters are desired for colorants that impart, for example, but not necessarily, a yellow shade to the target resin. It is believed and, as noted above, has been determined that such desirable polyester plastic colorations with the characteristics noted above are possible through the addition of certain pendant groups to the chromophore backbone which do not act as couplers or color modifiers and thus any chromophore (and resultant hue or tint) may be utilized.

Previous coloring agents for such end-uses have included pigments, dyes, or dyestuffs, with each having its own drawback. For instance, such pigments, dyes, and/or dyestuffs have not been widely introduced as colorants within plastics (such as polyolefins, polyurethanes, and the like) due to such physical limitations. However, the utilization of such colorants is highly desired for a number of reasons, foremost the actual colorations available from such specific compounds.

The standard types of polymeric colorants now utilized within plastics (be they thermoplastics or thermoset types) are primarily higher molecular weight poly(oxyalkylenated) compounds, such as methines, and the like (i.e., those found within U.S. Patent U.S. Pat. No. 4,992,204, to Kluger et al.). Some of these colorants exhibit certain problems in associated with the high color loading required to obtain significant color strengths within certain thermoplastics, such as polyesters, as one important example. Such high color loadings have a detrimental impact on the intrinsic viscosity of the target polyester (such as polyethylene terephthalate) which can effectively deleteriously have a direct impact on the strength of the target plastic itself. Thus, colorants are needed that do not exhibit such problematic effects on polyesters while still permitting thorough and substantially uniform colorations throughout the target polyester (as one thermoplastic example). Other chromophores cannot be utilized (such as triphenyl methanes, and certain azos) due to their lack of sufficient thermal stability to retain colorability when exposed to processing conditions associated with thermoplastic (e.g., primarily polyester) production. Thus, there is a need to select proper chromophores to provide yellow colorations as well as proper poly(oxyalkylene) chains and monomers in order to provide proper yellow poly(oxyalkylenated) colorants for utilization within thermoplastic (again, primarily, but not solely, polyester) formulations and articles. To date, only the higher molecular weight, and thus low color strength and/or thermally unstable, poly(oxyalkylenated) colorants have been taught within the prior art. Other colorants of either like high molecular weight or non-polymeric types have also been taught but suffer from a number of drawbacks (such as toxicity, lightfastness, thermal stability, ease in handling, and the like). There is thus a desire to introduce new types of colorants that meet these required characteristics and thus exhibit needed versatility with excellent coloring ability within desired end-uses, such as, without limitation, thermoplastics and thermosets. To date, although some liquid colorants (other than less-than-reliable pigment dispersions) have been developed for such target end-uses, unfortunately, as noted above, they have also exhibited certain limitations. A new liquid yellow colorant that provides effective colorations for such myriad end-uses as noted above and that exhibits excellent colorations, lightfastness, thermal stability, mixing with other coloring agents, and low toxicity, at least, is thus highly desired. Again, to date, there have been no teachings or fair suggestions of such a highly desirable, specific potentially liquid yellow colorant within the pertinent prior art or within the colorant industry itself.

DESCRIPTION OF THE INVENTION

It has thus now been determined that the attachment to a specific cyanoester methine compound of specific poly(oxy-$C_2$–$C_4$-alkylene) chains averaging at least 3 monomeric units and at most 6 monomeric units provides the needed and highly desired performance requirements noted above, particularly for transparent polyester formulations and articles. It is thus an object of the invention to provide such a colorant exhibiting (at least) excellent colorations (at low color loadings and thus causing minimal effects on intrinsic viscosity), low extraction levels, thermal stability, and lightfastness within target polyester articles (although such a specific liquid yellow colorant may be introduced within any number of thermoplastic and/or thermoset systems and/or articles). Another object of this invention to provide a yellow polymeric colorant exhibiting poly(oxyalkylene) groups that is easy to process, mixes well within target plastics, and provides excellent colorations at low color loadings within the target finished articles. Yet another object of this invention is to provide excellent colorations within liquid compositions (such as inks, and the like) through the utilization of such yellow liquid cyanoester-methine-based polymeric colorants, as noted above.

It is to be understood that the term alkyl as used throughout in relation to the ester portion of the cyanoester moiety on the methine backbone is intended to encompass any straight or branched alkyl moiety, having from 2 to 8 carbon atoms total, preferably, though not necessarily, an even number of carbon atoms within that range; the term poly (oxyalkylene) or alkyleneoxy, unless more specifically defined herein, is intended to encompass either oxyethylene, oxypropylene, or oxybutylene, with oxyethylene and oxypropylene preferred. It should be well understood by the ordinarily skilled artisan within the polymeric colorant field that an exact number of oxyalkylene monomers is rather difficult to attach and thus an average number is a more appropriate manner of describing such colorants in terms of poly(oxyalkylene) chain lengths. Although such an average is more proper as a description, it is still preferable, if possible, to attach a narrow distribution of different numbers of monomers (e.g., with an average of 5, most compounds will preferably exhibit at most 6 and at least 3 monomers) to the target chromophore. Therefore, the description of at most 6 monomers and at least 3 monomers is also preferable for specific embodiments, rather than averaging at most 6 monomers and at least 3 monomers.

The present invention preferably encompasses liquid, waxy, or pasty (at room temperature and standard pressure) colorants conforming to the structure of Formula (I)

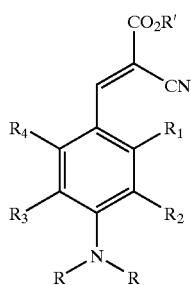

(I)

wherein $R_1$, $R_2$, $R_3$, and $R_4$, are the same or different and are selected from the group consisting of $C_{1-20}$ alkyl, halo, hydroxyl, hydrogen, cyano, sulfonyl, sulfo, sulfato, aryl, nitro, carboxyl, and $C_{1-20}$, alkoxy; R' is $C_1$–$C_8$ alkyl (either branched or unbranched if above three carbon atoms in length); and R is $[(EO)_w(PO)_x(BO)_y(EO)_z]$-H, wherein EO connotes ethyleneoxy, PO connotes propyleneoxy, BO connotes butyleneoxy, w is 1, x is 0–3, y is 0–3, and z is 2–6, wherein $3 \leq w+x+y+z \leq 6$. Block copolymers are not required as mixed copolymers also function properly.

Compositions comprising such compounds of (I) are also encompassed within this invention, particularly those comprising such compounds and bluing agents, as liquids or as pellets for further introduction within desired molten thermoplastic formulations. Methods of making such compositions, particularly thermoplastics, comprising such compounds of (I) are also contemplated within this invention.

The term "thermoplastic" is intended to encompass any synthetic polymeric material that exhibits a modification in physical state from solid to liquid upon exposure to sufficiently high temperatures. Most notable of the preferred thermoplastic types of materials are polyolefins (i.e., polypropylene, polyethylene, and the like), polyester (i.e., polyethylene terephthalate, and the like), polyamides (i.e., nylon-1,1, nylon-1,2, nylon-6 or nylon-6,6), polystyrenes, polyurethanes, polycarbonates, polyvinyl halides (i.e., polyvinyl chloride and polyvinyl difluoride, as merely examples), and the like. Preferred thermoplastics within this invention are polyesters and polyolefins, and most preferred is polyethylene terephthalate.

Such thermoplastic articles include bottles, storage containers, sheets, films, fibers, plaques, hoses, tubes, syringes, and the like. Included within this list would be polyester, polystyrene and other like resinous materials in sheet form which are present within windows for strength and resiliency functions. In such an instance, the inventive colorant compounds would provide or contribute to excellent colorations to such thermoplastic articles for decorative, aesthetic, and/or protective (such as ultraviolet or infrared protection) purposes. Basically, the possible uses for such a low-migratory, thermally stable colorant for such items as thermoplastics (particularly polyesters such as transparent polyethylene terephthalate) is voluminous and cannot easily be enveloped. Other possible end-uses, however, would include within solvent systems, printing inks, within and on textiles (either on or within textiles, fibers, or fabrics) and the like.

Other types of articles contemplated within this invention for the inventive colorant compounds include, again without limitation, thermoplastic articles, such as films, sheets, bottles, containers, vials, and the like, as well as thermosets (e.g., formulations that become solid in nature upon exposure to sufficient heat or amount of catalyst), such as polyurethanes, and the like, including, without limitation, though preferably, polyurethane foams. Other colorants may be added to or incorporated therein with such inventive colorant compounds to produce different hues and tints, again for aesthetic, decorative, and/or protective purposes. Ultraviolet absorbers may also be introduced, incorporated, and the like, in order to protect the article or, if in container for, the contents therein. In concert with certain embodiments of the inventive colorant, or combinations of colorants with certain inventive colorant embodiments, such UV absorbers may be added in reduced amounts, potentially, due to the protective abilities of the colorant or combination thereof in terms of reducing ultraviolet transmission (or inversely increasing ultraviolet absorptions).

Such thermoplastic colorants (and other additives) are typically added to such compositions during the injection molding (or other type of molding, such as blow molding), thereof, including, and without limitation, by mixing the liquid absorber with resin pellets and melting the entire coated pellets, or through a masterbatch melting step while the resin and absorber are pre-mixed and incorporated together in pellet form. Such plastics include, again without limitation, polyolefins, polyesters, polyamides, polyurethanes, polycarbonates, and other well known resins, such as those disclosed within U.S. Pat. No. 4,640,690, to Baumgartner et al., and U.S. Pat. No. 4,507,407, to Kluger et al. under the term "thermoplastics". Generally, such plastics, including the colorant, UV absorber, and other potential additives, are formed through any number of various extrusion, etc., techniques, such as those disclosed in the aforementioned U.S. patents. Preferred thermoplastics are polyesters, such as, in one non-limiting embodiment, polyethylene terephthalate. "Plastic packaging" thus encompasses containers, sheets, blister packages, and the like, utilized for storage purposes and which include the plastics in any combination as noted above.

The term "pure, undiluted state" as used in conjunction with the inventive colorant compounds indicates that the compounds themselves without any additives are liquid at room temperature or are flowable (viscosity of at most 60,000 cps) when heated to 40° C. Thus, there is no need to add solvents, viscosity modifiers, and other like additives to the compounds to effectuate such a desirable physical state.

The presence of surfactants, solvents, and the like, may be utilized to alter the solubility, coloring characteristics, and the like, of the ultimate inventive polymeric methine colorant which would be understood and appreciated by the ordinarily skilled artisan within this particular art The colorant compound (I), above, is, again, liquid in nature at ambient temperature and pressure and at substantial purity; however, pasty or waxy colorants are also encompassed within this invention, due to their handling improvement over clearly solid colorants of similar structures. In order to effectuate coloring of substrates and media, any other standard colorant additives, such as resins, preservatives, surfactants, solvents, antistatic compounds, antimicrobial agents, and the like, may also be utilized within the inventive colorant compound compositions or methods.

The inventive colorant compounds may be added in any amount to such thermoplastics up to their saturation limits therein. Preferably, the amount is between about 0.00001 ppm to about 25,000 ppm per total amount of resin; more preferably from about 0.001 to about 15,000 ppm; still more preferably from about 0.1 to about 5,000 ppm; and most preferably from about 100 to about 2,500 ppm. Of course, the more colorant present, the darker the shade therein. When mixed with other colorants within the target thermoplastic, the same amounts would be preferred with the saturation limit dependent upon the amount of any extra colorants therein.

DESCRIPTION OF THE PREFERRED EMBODIMENT

The specific formulations below, as well as the following exemplified methods of producing such and methods of coloring using such are thus indicative of the preferred embodiments of this invention (as noted above, the number of oxyalkylene monomers are actually average numbers):

EXAMPLE 1

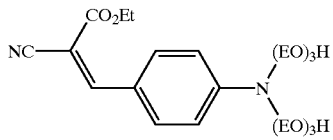

To a 250 mL round bottom flask was added alkoxylated (6EO) aldehyde of aniline (55.5 g), glycine (0.7 g), ethyl cyanoacetate (17.1 g), and water (20 g). The ensuing reaction mixture was placed on a rotary evaporator and mixed for approximately 5 minutes. The reaction mixture was then heated to 90–95° C. for 2.5 hours while a water aspirator vacuum was applied to the rotary evaporator. The ensuing amber/yellow liquid was allowed to cool to ambient temperature overnight. Water (140 g) was then added to the product. The reaction mixture was then heated to 75° C. and poured into a separatory funnel. The solution was allowed to phase for 30 minutes. The bottom product layer was removed and washed two additional times with 140 g of water as above. The final product layer was stripped via rotary evaporator to remove water to give 43 g of a yellow/amber liquid exhibiting a $\lambda_{max}$ absorbance in methanol of 423 nm and a color value of 93.5.

EXAMPLE 2

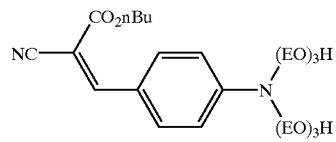

To a 250 mL round bottom flask was added alkoxylated (6EO) aldehyde of aniline (57.1 g), glycine (0.8 g), butyl cyanoacetate (21.9 g), and water (20 g). The ensuing reaction mixture was placed on a rotary evaporator and mixed for approximately 5 minutes. The reaction mixture was then heated to 90–95° C. for 2 hours while a water aspirator vacuum was applied to the rotary evaporator. The ensuing amber/yellow liquid was allowed to cool to ambient temperature overnight. Water (150 g) was then added to the product. The reaction mixture was then heated to 70–75° C. and poured into a separatory funnel. The solution was allowed to phase for 30 minutes. The bottom product layer was removed and washed two additional times with 150 g of water as above. The final product layer was stripped via rotary evaporator to remove water to give 49.5 g of a yellow/amber liquid exhibiting a $\lambda_{max}$ absorbance in methanol of 423 nm and a color value of 90.1.

EXAMPLE 3

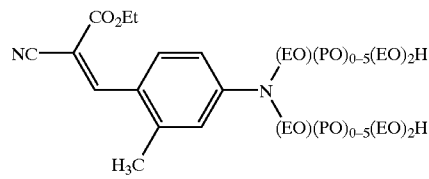

To a 250 mL round bottom flask was added alkoxylated (2EO1PO4EO) aldehyde of m-Toluidine (46 g), glycine (0.7 g), ethyl cyanoacetate (11.9 g), and water (20 g). The ensuing reaction mixture was placed on a rotary evaporator and mixed for approximately 5 minutes. The reaction mixture was then heated to 90–95° C. for 1.5 hours while a water aspirator vacuum was applied to the rotary evaporator. The ensuing amber/yellow liquid was allowed to cool to ambient temperature overnight. Water (140 g) was then added to he product. The reaction mixture was then heated to 70–75° C. and poured into a separatory funnel. The solution was allowed to phase for 30 minutes. The bottom product layer was removed and washed two additional times with 140 g of water as above. The final product layer was stripped via rotary evaporator to remove water to give 45 g of a yellow/amber liquid exhibiting a $\lambda_{max}$ absorbance in methanol of 423 nm and a color value of 78.9.

EXAMPLE 4

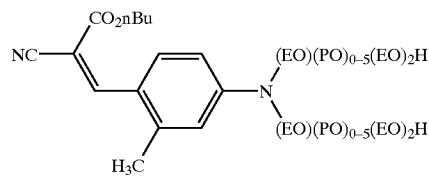

To a 300 mL round bottom flask was added alkoxylated (2EO-1PO-4EO) aldehyde of m-Toluidine (50.2 g), glycine (0.4 g), butyl cyanoacetate (18.2 g), and water (20 g). The ensuing reaction mixture was placed on a rotary evaporator and mixed for approximately 5 minutes. The reaction mixture was then heated to 90–95° C. for 2 hours while a water aspirator vacuum was applied to the rotary evaporator. The ensuing amber/yellow liquid was allowed to cool to ambient temperature overnight. Water (250 g) was then added to the product. The reaction mixture was then heated to 70–75° C. and poured into a separatory funnel. The solution was allowed to phase for 30 minutes. The bottom product layer was removed and washed two additional times with 250 g of water as above. The final product layer was stripped via rotary evaporator to remove water to give 56.5 g of a yellow/amber liquid exhibiting a $\lambda_{max}$ absorbance in methanol of 433 nm.

EXAMPLE 5

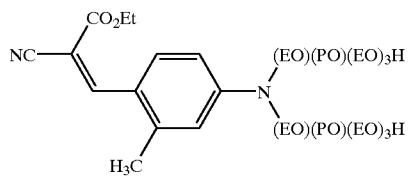

To a 500 mL round bottom flask was added alkoxylated (2 EO 2 PO 6EO) aldehyde of m-Toluidine (157.5 g), glycine (1.0 g), butyl cyanoacetate (31 g), and water (33 g). The ensuing reaction mixture was placed on a rotary evaporator and mixed for approximately 5 minutes. The reaction mixture was then heated to 90–95° C. for 2 hours while a water aspirator vacuum was applied to the rotary evaporator. The ensuing amber/yellow liquid was allowed to cool to ambient temperature overnight. Water (250 g) was then added to the product. The reaction mixture was then heated to 70–75° C. and poured into a separatory funnel. The solution was allowed to phase for 30 minutes. The bottom product layer was removed and washed one additional time with 250 g of water as above. The final product layer was stripped via rotary evaporator to remove water to give 162.2 g of a yellow/amber liquid exhibiting a $\lambda_{max}$ absorbance in methanol of 423 nm and a color value of 55.7.

EXAMPLE 6

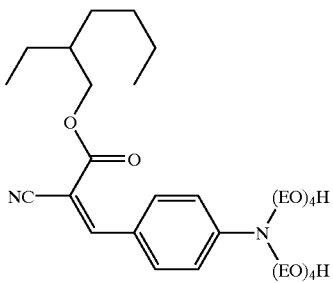

To a 3-neck 250 mL round bottom flask equipped with a thermometer and reflux condensor was added the alkoxylated (8EO) aldehyde of aniline (75 g), ammonium carbonate (0.7 g), 2-ethylhexyl cyanoacetate (41.1 g). The ensuing mixture was then heated to 80–85 C for 2 hours to give a yellow/amber liquid. Water (250 g) was then added to the product. The reaction mixture was then heated to 75–80° C. and poured into a separatory funnel. The solution was allowed to phase for 30 minutes. The bottom product layer was removed and washed one additional time with 200 g of water as above. The final product layer was stripped via rotary evaporator to remove water to give 90 g of a yellow/amber liquid exhibiting a $\lambda_{max}$ absorbance in methanol of 423 nm and a color value of 65.8.

EXAMPLE 7

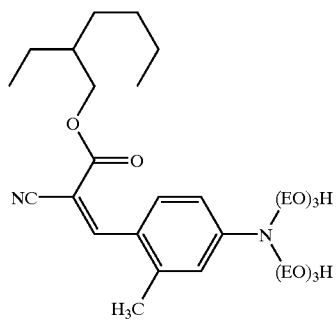

To a 250 mL 1-neck round bottom flask equipped with a thermometer and reflux condensor was added the alkoxylated (6EO) aldehyde of m-Toluidine (50 g) at 75.4% solids, glycine (0.4 g), and 2-ethylhexyl cyanoacetate (18.6 g). The ensuing mixture was then heated to 80–85° C. for 2 hours to give a yellow/amber liquid. Water (200 g) was then added to the product. The reaction mixture was then heated to 75° C. and poured into a separatory funnel. The solution was allowed to phase for 30 minutes. The product layer was stripped via rotary evaporator to remove water to give 46 g of a yellow/amber liquid exhibiting a $\lambda_{max}$ absorbance in methanol of 432 nm and a color value of 74.6.

EXAMPLE 8 (Comparative)

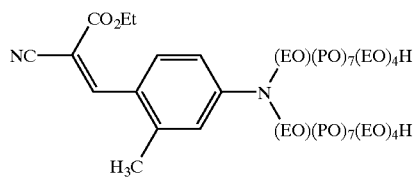

To a 3-neck 250 mL round bottom flask equipped with a thermometer and reflux condenser was added the alkoxylated (2EO 14PO 8EO) aldehyde of m-Toluidine (125.5 g), ammonium carbonate (0.7 g), ethyl cyanoacetate (13.8 g). The ensuing mixture was then heated to 80–85 C for 2 hours to give a yellow/amber liquid. Water (250 g) and ammonium carbonate (0.5 g) were then added to the product. The reaction mixture was then heated to 75–80° C. and poured into a separatory funnel. The solution was allowed to phase for 30 minutes. The bottom product layer was removed and washed one additional time with 250 g of water and ammonium carbonate (0.5 g) as above. The final product layer was stripped via rotary evaporator to remove water to give 110 g of a yellow/amber liquid exhibiting a $\lambda_{max}$ absorbance in methanol of 434 nm and a color value of 25.1.

EXAMPLE 9

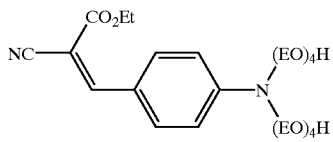

To a 1-neck 250 mL round bottom flask equipped with a thermometer and reflux condenser was added the alkoxylated (8EO) aldehyde of Aniline (40 g), glycine (0.3 g), ethyl cyanoacetate (10 g) and water (10 g). The ensuing reaction mixture was placed on a rotary evaporator and mixed for approximately 5 minutes. The reaction mixture was then heated to 90–95° C. for 2 hours while a water aspirator vacuum was applied to the rotary evaporator to give an amber/yellow oil. Water (175 g) was added to the product. The reaction mixture was then mixed and heated to 75–80° C. and poured into a separatory funnel. The solution was allowed to phase for 30 minutes. The bottom product layer was removed and stripped via rotary evaporator to remove water to give 39.1 g of a yellow/amber liquid exhibiting a $\lambda_{max}$ absorbance in methanol of 422 nm and a color value of 72.

EXAMPLE 10

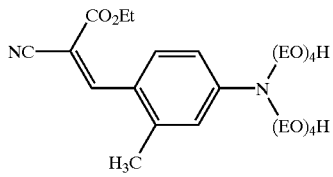

To a 1-neck 250 mL round bottom flask equipped with a thermometer and reflux condensor was added the alkoxylated (8EO) aldehyde of m-Toluidine (60 g @80.2% solids), glycine (0.4 g), ethyl cyanoacetate (11.4 g) and water (10 g). The ensuing reaction mixture was placed on a rotary evaporator and mixed for approximately 5 minutes. The reaction mixture was then heated to 90–95° C. for 2 hours while a water aspirator vacuum was applied to the rotary evaporator to give an amber/yellow oil. Water (200 g) was added to the product. The reaction mixture was then mixed and heated to 85° C. The mixture was then poured into a separatory funnel and allowed to phase for 30 minutes to give a homogeneous amber/yellow liquid. No visible separation occurred between the water and the product layer. Water (200 g) and methylene chloride (100 g) were added and the solution mixed. The solution was poured into a separatory funnel and allowed to phase for 30 minutes. The bottom product/methylene chloride layer was drained and stripped to remove residual methylene chloride and water to give a yellow oil exhibiting a $\lambda_{max}$ absorbance in methanol of 433 nm and a color value of 68.1.

EXAMPLE 11

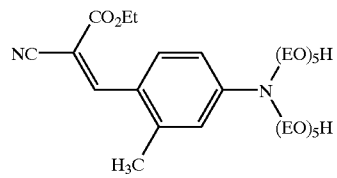

To a 1-neck 250 mL round bottom flask equipped with a thermometer and reflux condenser was added the alkoxylated (10EO) aldehyde of m-Toluidine (25 g), glycine (0.3 g), ethyl cyanoacetate (5.2 g) and water (7.7 g). The ensuing reaction mixture was placed on a rotary evaporator and mixed for approximately 5 minutes. The reaction mixture was then heated to 90–95° C. for 2 hours while a water aspirator vacuum was applied to the rotary evaporator to give an amber/yellow oil. Max. Abs. (MeOH) 433 nm. The above yellow oil (16 g) was mixed with 70 g of water and heated to 85° C. The mixture was then poured into a separatory funnel and allowed to phase for 30 minutes to give a homogeneous amber/yellow liquid. No visible separation occurred between the water and the product layer and the solution exhibited a color value of 59.9.

EXAMPLE 12

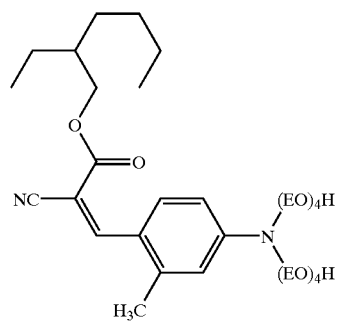

To a 300 mL 1-neck round bottom flask equipped with a thermometer and reflux condenser was added the alkoxylated (8EO) aldehyde of m-Toluidine (50 g) at 80.2% solids, glycine (0.3 g), and 2-ethylhexyl cyanoacetate (17.1 g). The ensuing mixture was then heated to >90° C. for 2 hours to give a yellow/amber liquid. Water (200 g) was then added to the product. The reaction mixture was then heated to 85° C. and poured into a separatory funnel. The solution was allowed to phase for 30 minutes. The product layer was stripped via rotary evaporator to remove water to give 37.2 g of a yellow/amber liquid exhibiting a $\lambda_{max}$ absorbance in methanol of 432 nm and a color value of 58.9.

EXAMPLE 13

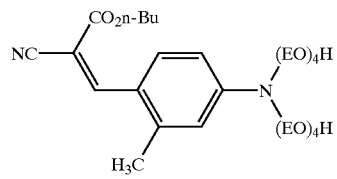

To a 300 mL 1-neck round bottom flask equipped with a thermometer and reflux condenser was added the alkoxylated (8EO) aldehyde of m-Toluidine (50 g) at 80.2% solids, glycine (0.3 g), and butyl cyanoacetate (12.2 g). The ensuing mixture was then heated to >90° C. for 2 hours to give a yellow/amber liquid. Water (200 g) was then added to the product. The reaction mixture was then heated to 85° C. and poured into a separatory funnel. The solution was allowed to phase for 30 minutes. The product layer was stripped via rotary evaporator to remove water to give 34.8 g of a yellow/amber liquid exhibiting a $\lambda_{max}$ absorbance in methanol of 432 nm and a color value of 58.7.

EXAMPLE 14

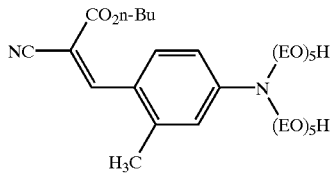

To a 300 mL 1-neck round bottom flask equipped with a thermometer and reflux condenser was added the alkoxylated (10EO) aldehyde of m-Toluidine (50 g) at 79% solids, glycine (0.3 g), and butyl cyanoacetate (10.1 g). The ensuing mixture was then heated to >90° C. for 2 hours to give a yellow/amber liquid. Water (200 g) was then added to the product. The reaction mixture was then heated to 85° C. and poured into a separatory funnel. The solution was allowed to phase for 30 minutes. No visible separation occurred between the product layer and the water. Methylene chloride (100 g) was added and the solution remixed. The mixture was allowed to phase 30 minutes after which the bottom product/methylene chloride layer was removed. This layer was stripped via rotary evaporator to give 36.4 g of a yellow/amber liquid exhibiting a $\lambda_{max}$ absorbance in methanol of 432 nm and a color value 58.1.

EXAMPLE 15

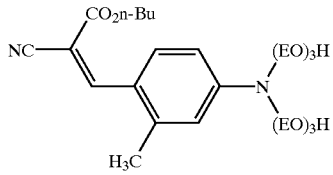

To a 300 mL 1-neck round bottom flask equipped with a thermometer and reflux condenser was added the alkoxylated (6EO) aldehyde of m-Toluidine (81.3 g ) at 64.4% solids, glycine (0.5 g), and butyl cyanoacetate (18.1 g). The ensuing mixture was then heated to >90° C. for 1.5 hours to give a yellow/amber liquid. Water (250 g) was then added to the product. The reaction mixture was then heated to 85° C. and poured into a separatory funnel. The solution was allowed to phase for 30 minutes. The above wash procedure was repeated. The product layer was stripped via rotary evaporator to remove water to give 64.9 g of a yellow/amber liquid exhibiting a $\lambda_{max}$ absorbance in methanol of 432 nm and a color value of 74.1.

EXAMPLE 16 (Comparative)

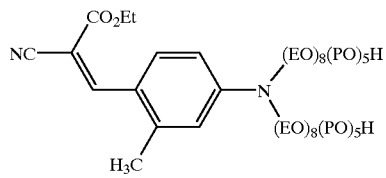

To a 3-neck 1 liter round bottom flask equipped with a thermometer and reflux condenser was added the alkoxylated (16EO 10PO) aldehyde of m-Toluidine (178.3g), ammonium carbonate (1 g), ethyl cyanoacetate (20.7 g). The ensuing mixture was then heated to 95–100 C for 1 hour to give a yellow/amber liquid. Water (320 g) and ammonium carbonate (7 g) were then added to the product. The reaction mixture was then heated to 70° C. and poured into a separatory funnel. The solution was allowed to phase for 30 minutes. The bottom product layer was removed and washed one additional time with 320 g of water and ammonium carbonate (7 g) as above. The final product layer was stripped via rotary evaporator to remove water to give 163 g of a yellow/amber liquid exhibiting a $\lambda_{max}$ absorbance in methanol of 434 nm and a color value of 26.1.

EXAMPLE 17

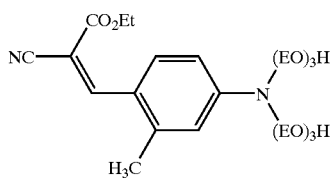

To a 250 mL 1-neck round bottom flask was added the alkoxylated (6EO) aldehyde of in-Toluidine (50.5 g @79.6% solids), glycine (0.8 g), ethyl cyanoacetate (12 g). The ensuing mixture was placed on a rotary evaporator and mixed for approximately 5 minutes. The reaction mixture was then heated to 95–100 C for 1.5 hour to give a yellow/amber liquid. Water (200 g) was then added to the product. The reaction mixture was then heated to 70–75° C. and poured into a separatory funnel. The solution was allowed to phase for 30 minutes. The bottom product layer was removed and washed one additional time with 200 g of water as above. The final product layer was stripped via rotary evaporator to remove water to give 45.5 g of a yellow/amber liquid exhibiting a $\lambda_{max}$ absorbance in methanol of 434 nm and a color value of 80.8.

EXAMPLE 18

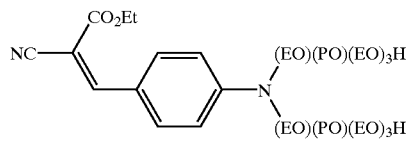

To a 3-neck 250 mL round bottom flask equipped with a thermometer and reflux condenser was added the alkoxylated (2EO 2PO 6EO) aldehyde of aniline (51 g), ammonium carbonate (0.8 g), and ethyl cyanoacetate (12.8 g). The ensuing mixture was then heated to 95–100° C. for 1.5 hours to give a yellow/amber liquid. Water (125 g) was then added to the product. The reaction mixture was then heated to 70–75° C. and poured into a separatory funnel. The solution was allowed to phase for 30 minutes. The bottom product layer was removed and washed one additional time with 125 g of as above. The final product layer was stripped via rotary evaporator to remove water to 51 g of a yellow/amber liquid exhibiting a $\lambda_{max}$ absorbance in methanol of 422 nm and a color value of 69.4.

Thermoplastic Composition Formation in Polyester

In each instance noted below, the sample liquid colorant was introduced within an injection molding operation for a polyester thermoplastic, in this instance polyethylene terephthalate (ClearTuf® 8006 PET resin from M & G). The liquid colorant, in an amount of 1,500 ppm of the total amount of resin, was blended via agitation onto the hot, dried polyethylene terephthalate resin (in pellet form). The blend of colorant and pellets was gravity fed into the feed throat of the machine. In the feed section, melting was accomplished through the utilization of a heated (heat transferred from the barrel of the machine) screw extruder which rotated. The rotation of the screw provided thorough mixing of the colorant and molten resin together producing a uniform plastic melt which was injected into a mold in order to form the thermoplastic article, for instance a 2 inch by 3 inch plaque with a uniform thickness of 50 mils and a surface area of 12.5 in$^2$.

This method was followed for the production of PET plaques comprising the, colorants of Examples 1, 4, 5, 8, and 15, above, all of which exhibited pleasing yellow shades with no visible color differences, bubbles, streaks, or other deleterious effects in both sample plaques.

Extraction Analyses for Inventive Colored Plastics a) PET Plaques

The plaques made above were tested for extraction of color under the following procedure (having a detection limit of 10 ppb) (hereinafter referred to as the "cheated alcohol extraction test"):

Eight plaques were cut in half and placed in a stainless steel extraction vessel. To the extraction vessel was added 125 g of 95% ethanol (preheated to 70° C.) was added. The vessels were sealed and then placed in a 70° C. oven for 2.5 hours. The vessels were then removed and allowed to cool to room temperature. In all cases, the plaques were separated with small glass slides and were completely immersed and exposed to the extraction solvent. This test was then duplicated for the same sample.

The extracts were then analyzed spectrophotometrically to determine the presence or absence of extracted colorant. A Beckman® DU 650 spectrophotometer with a 10.0 cm path length cell was used. The instrument was first calibrated to zero using the extract obtained from the uncolored polyester plaques. The extract from the extraction of the plaques containing the various colorant additives was then scanned through the ultraviolet/visible range to determine the presence or absence of detectable peaks at the additives' lambda max.

TABLE 1

Extraction data for Inventive Colored PET Resins

| Plaque Designation | Colorant | Color Loading | Absorbance Result |
|---|---|---|---|
| A | from Example 1 | 1730 ppm | a) 0.01 |
|   |   |   | b) 0.01 |
| B | from Example 4 | 2046 ppm | a) 0.02 |
|   |   |   | b) 0.02 |
| C | from Example 5 | 2162 ppm | a) 0.03 |
|   |   |   | b) 0.03 |
| D (Comparative) | from Example 8 (Comparative) | 6032 ppm | a) 0.06 |
|   |   |   | b) 0.07 |
| E | from Example 15 | 2000 ppm | a) 0.02 |
|   |   |   | b) 0.02 |
| F (Comparative) | from Example 6 (Comparative) | 5704 ppm | a) 0.06 |
|   |   |   | b) 0.06 |

Such low absorption measurements thus indicate very low extraction levels for the inventive colorants within the PET samples, particularly at low loading levels to produce equivalent color strengths (comparative plaque D thus requires a much greater amount of colorant to provide equivalent color strengths resulting in much higher extraction levels).

Intrinsic Viscosity Analyses of Methine Colorants

The sample colorants were introduced within a mixing operation for a polyester thermoplastic, for instance polyethylene terephthalate (as above). The mixing step was accomplished by the use of a C.W. Brabender Electronic Plasti-Corder®, model number EPL-V5501, torque rheometer with a Type Six 2-piece mixer attachment. Cam style removable blades were used in the mixer attachment providing a medium shear-rate mixing. The temperature of the mixing chamber was set to 285 C and controlled via electric heating and air cooling.

The liquid colorant was weighed into a small disposable syringe. The loading of the liquid colorant was determined and adjusted based on the strength of the colorant. The hot, dried polyethylene terephthalate resin, specifically M & G ClearTuf® 8006, in pellet form, was quickly weighed into a glass jar and sealed to minimize the adsorption of moisture by the resin. The torque rheometer mixing blades were turned on and set to a speed of 25 rpm as indicated by the digital display. A 25 ft$^3$/h flow of dried nitrogen gas was introduced into the mixing chamber through the loading ram.

The dried polyethylene terephthalate resin was then poured into the mixing chamber and the loading ram was closed while the nitrogen gas continued to flow into the chamber. Simultaneously, a stopwatch was then started to mark the beginning of the operation. After 1 minute and 30 seconds of mixing, the loading ram was raised and the liquid colorant was dispensed into the molten polyester resin. The loading ram was lowered and the liquid colorant was allowed to mix with the molten polyester resin for an additional 1 minute and 30 seconds.

After such time, the blades were then stopped and the loading ram was raised. The blades were reversed and a metal spatula was used to remove a sample of the molten, colored polyester from the mixing chamber. This molten sample was immediately compressed between two metal plates and allowed to cool to form the final thermoplastic disk.

The intrinsic viscosity of the colored thermoplastic disk was measured according to ASTM D4603. The intrinsic viscosity of the colored thermoplastic disk was compared to the intrinsic viscosity of an uncolored thermoplastic control disk, via the formula: The uncolored thermoplastic control disk was processed in the same manner as described above but without the addition of the liquid colorant. The following results reflect these measurements for example 16 (comparative) and example 17 (inventive).

TABLE 2

IV Loss Data for Resins

| Colorant | Color Loading (ppm) | IV Loss |
|---|---|---|
| Example 16 (comparative) | 1525 | 0.030 |
| Example 17 (inventive) | 1810 | 0.008 |

This data indicates that the inventive color composition has a much lower (more preferred) effect on the polyester molecular weight at approximately equal color loadings than the comparative methine colorant.

Inventive Yellow Colorants in Polyurethane Foams

Certain inventive and comparative yellow methine colorants were incorporated within a urethane foam formulation in varying amounts based on the color strength (measured as Absorbance/gram/L) of the colorant. Thus the color strength within each tested foam was the same (while the amounts of colorant were not always the same).

The colorants were added to 100 parts of an ether triol (MW of approximately 3000), which was mixed with 4.53 parts water, 1.0 part silicone surfactant, 0.15 parts stannous octoate catalyst and 0.05 parts triethylene diamine. Next, 58.5 parts toluene diisocyanate (80/20) were allowed to react at ambient conditions for approximately two minutes. The foam was then cured in a 160° C. oven for 3 minutes and 48 hours at room temperature.

After the foams had cured, they were tested for extractability using the following method: One gram of foam was removed from the center of the polyurethane bun. This material was then immersed within 75 mL of methanol in a glass jar, sealed and extracted for 1 hour. The amount of color that extracted from the foam is determined by measuring the absorbance of the extracting solution on a Beckman DU-650 spectrophotometer. The extraction results are summarized below.

TABLE 3

Extraction Data for Polyurethane Foams

| Example # | Wgt used in foam | CV | Coupler Chain | Extraction Abs |
|---|---|---|---|---|
| 8 (compar.) | 4.1 | 25.1 | mTol 2EO 14PO 8EO | 0.154, 0.154 |
| 1 (inventive) | 1.1 | 93.5 | Aniline 6EO | 0.071, 0.070 |
| 18 (inventive) | 1.5 | 69.4 | Aniline 2EO 2PO 6EO | 0.084, 0.075 |

Thus, the inventive colorants exhibited excellent low extraction levels at much higher color strengths than compared with the higher molecular weight types of the prior art.

Overall, then, the inventive yellow colorants provide far greater color strength with much lower chain lengths than the previously disclosed polymeric colorants. As a result, the IV modifications are much less for the inventive colorants, thereby providing a more reliable finished thermoplastic product in terms of physical resliency. Furthermore, the inventive colorants still exhibit the proper low levels of extraction. As a result, it is evident that the selection of low molecular weight, short oxyethylene-capped polymeric chains for the specific yellow chromophore yields unexpectedly good characteristics for thermoplastic an/or thermoset applications.

While specific features of the invention have been described, it will be understood, of course, that the invention is not limited to any particular configuration or practice since modification may well be made and other embodiments of the principals of the invention will no doubt occur to those skilled in the art to which the invention pertains. Therefore, it is contemplated by the appended claims to cover any such modifications that incorporate the features of the invention within the true meaning, spirit, and scope of such claims.

I claim:

1. A compound conforming to the structure of (I)

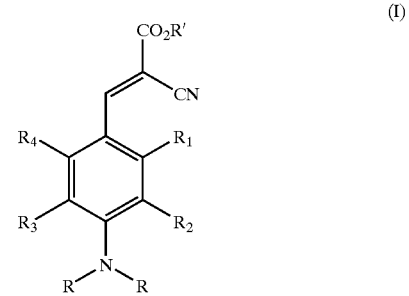

wherein $R_1$, $R_2$, $R_3$, and $R_4$ are the same or different and are selected from the group consisting of $C_{1-20}$ alkyl, halo, hydroxyl, hydrogen, cyano, sulfonyl, sulfo, sulfato, aryl, nitro, carboxyl, and $C_{1-20}$ alkoxy; R' is $C_1$–$C_8$ alkyl; and R is $[(EO)_w(PO)_x(BO)_y(EO)_z]$-H, wherein EO connotes ethyleneoxy, PO connotes propyleneoxy, BO connotes butyleneoxy, w is 1, x is 0–3, y is 0–3, and z is 2–4, wherein 3<w+x+y+z<6.

* * * * *